United States Patent
Bossen et al.

(10) Patent No.: US 8,208,564 B2
(45) Date of Patent: Jun. 26, 2012

(54) METHOD AND APPARATUS FOR VIDEO ENCODING AND DECODING USING ADAPTIVE INTERPOLATION

(75) Inventors: Frank Bossen, Plan-les Quates (CH); Alexandros Tourapis, Burbank, CA (US)

(73) Assignee: NTT Docomo, Inc., Tokyo (JP)

( * ) Notice: Subject to any disclaimer, the term of this patent is extended or adjusted under 35 U.S.C. 154(b) by 1719 days.

(21) Appl. No.: 11/452,043

(22) Filed: Jun. 12, 2006

(65) Prior Publication Data

US 2006/0294171 A1 Dec. 28, 2006

Related U.S. Application Data

(60) Provisional application No. 60/693,575, filed on Jun. 24, 2005.

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................. 375/240.29
(58) Field of Classification Search ........................ None
See application file for complete search history.

(56) References Cited

U.S. PATENT DOCUMENTS

| | | | |
|---|---|---|---|
| 6,927,783 B1* | 8/2005 | MacInnis et al. | 345/629 |
| 6,933,986 B2* | 8/2005 | Plonka | 348/732 |
| 6,990,249 B2* | 1/2006 | Nomura | 382/254 |
| 7,379,501 B2* | 5/2008 | Lainema | 375/240.29 |
| 7,511,769 B2* | 3/2009 | Renner et al. | 348/627 |
| 2004/0076333 A1 | 4/2004 | Zhang et al. | |

FOREIGN PATENT DOCUMENTS

WO WO 03/058945 A2 7/2003
WO WO 2006/108654 A 10/2006

OTHER PUBLICATIONS

Wedi, Thomas, "Adaptive Interpolation Filter for Motion and Aliasing Compensated Prediction". Visual Communications and Image Processing 2002. San Jose, CA Jan. 2002.
Chono, K. et al, "Adaptive Motion Interpolation on MB Basis". ISA/IEC JTC I/SC29/WG11 and ITU-T SG16 Q.6. Fairfax, Virginia May 2002.
Fuldseth, A., "Evaluation of Adaptive Interpolation Filter for Realtime Applications". ISO/IEC JTC/SC29/WG11 and ITU-T, JVT-0057.doc. Fairfax, Virginia May 2002.
Wedi, Thomas. "Adaptive Interpolation Filter for Motion Compensated Hybrid Video Coding". Proc. Picture Coding Symposium (PCS 2001), Seoul, Korea, Apr. 2001.

(Continued)

*Primary Examiner* — Nhon Diep
(74) *Attorney, Agent, or Firm* — Blakely, Sokoloff, Taylor & Zafman LLP

(57) ABSTRACT

A method and apparatus is disclosed herein for video encoding and/or decoding using adaptive interpolation is described. In one embodiment, the decoding method comprises decoding a reference index; decoding a motion vector; selecting a reference frame according to the reference index; selecting a filter according to the reference index; and filtering a set of samples of the reference frame using the filter to obtain the predicted block, wherein the set of samples of the reference frame is determined by the motion vector.

8 Claims, 13 Drawing Sheets

OTHER PUBLICATIONS

Wedi, Thomas. "Adaptive Interpolation Filter for H.26L". ITU-T Contribution VCEG-N28. http://ftp3.int/av-arch/video-site/0109_San/VCEG-N28.doc. Santa Barbara, CA Sep. 2001.

"Advanced Video Coding for Generic Audiovisual Services". Series H: Audiovisual and Multimedia System. ITU-T Telecommunication Standarization Section of ITU H.264.

T. Wiegand et. al., "Draft Errata List with Revision-Marked Corrections for H.264/AVC", California, Sep. 2003, ftp://ftp.imtc.org/jvt-experts/2003_09_SanDiego/JVT-1050.zip.

Wedi, T. E.: "Adaptive interpolation filter for motion compensated prediction," Institute of Electrical and Electronics Engineers; Proceedings 2002 International Conference on Image Processing. ICIP 2002, New York, NY: IEEE, US, vol. 2 of 3, Sep. 22, 2002, pp. 11509-11512, XP002406860, ISBN: 0-7803-7622-6, abstract, paragraphs [0002], [0003].

Vatis, Y., et al.: "Motion- And Aliasing-Compensated Prediction Using a Two-Dimensional Non-Separable Adaptive Wiener Interpolation Filter" Image Processing, 2005. ICIP 2005. IEEE International Conference on Genova, Italy Sep. 11-14, 2005, Piscataway, NJ, USA, IEEE, Sep. 11, 2005, pp. 894-897, XP002406855. ISBN: 0-7803-9134-9.

Schwartz, H. et al.: "Scalable Extension of H.264/AVC" ISO/IEC JTC1/CS29/WG11 MPEG04/M10569/S03, SS, SS, Mar. 2004, pp. 1-39, XP002340402.

PCT International Search Report for PCT Appln No. US2006/024528, mailed Mar. 8, 2007 (6 pages).

PCT Written Opinion for PCT Appln No. US2006/024528, mailed Mar. 8, 2007 (7 pages).

PCT Int'l. Preliminary Report on Patentability and Written Opinion of Int'l. Searching Authority for PCT/US2006/024528, Int'l. filing date Jun. 23, 2006, mailing date Jan. 10, 2008, (9 pages).

Chinese Office Action for corresponding Chinese Patent Application No. 200680022776.7, Sep. 27, 2010, 2 pgs.

* cited by examiner

METHOD AND APPARATUS FOR VIDEO ENCODING AND DECODING USING ADAPTIVE INTERPOLATION

PRIORITY

The present patent application claims priority to and incorporates by reference the corresponding provisional patent application Ser. No. 60/693,575, titled, "Method and Apparatus For Video Encoding and Decoding Using Adaptive Interpolation," filed on Jun. 24, 2005.

FIELD OF THE INVENTION

The present invention relates to the field of video coding and decoding; more particularly, the present invention relates to the use of adaptive interpolation in motion compensation.

BACKGROUND OF THE INVENTION

In most existing video compression systems and standards such as MPEG-2 and JVT/H.264/MPEG AVC, encoders and decoders mainly rely on intra-coding and inter-coding in order to achieve compression. In intra-coding, spatial prediction methods are used, while for inter-coding compression is achieved by exploiting the temporal correlation that may exist between pictures.

More specifically, previously encoded/decoded pictures are used as references for future pictures, while motion estimation and compensation is employed in order to compensate for any motion activity between these pictures. FIG. 1A illustrates motion compensation in P pictures (frames), while FIG. 1B illustrates motion compensation in B pictures (frames). More advanced codecs such as H.264 also consider lighting variations (e.g., during fade in/out) in order to generate a more accurate prediction if necessary. Finally, deblocking methods may also be used in an effort to reduce blocking artifacts created through the prediction and quantization processes.

Fractional sample interpolation is one of the techniques employed to further enhance the quality of motion compensated prediction, since it allows for a more precise representation of motion. Instead of using the actual samples of a reference, a filtering mechanism is employed where the samples within a reference are first filtered (interpolated) using a previously defined filter. FIG. 2 illustrates integer samples (shaded blocks with upper-case letters) and fractional sample positions (un-shaded blocks with lower-case letters) for quarter sample luma interpolation. Due to the non-ideal nature of the low-pass filters used during the image acquisition process, aliasing can be generated which can deteriorate the interpolation and the motion compensated prediction.

Most video coding architectures and coding standards, such as MPEG-1/2, H.263 and H.264 (or JVT or MPEG-4 AVC) employ fractional sample motion compensation to further improve the efficiency of motion compensated prediction. Older standards are primarily based on bilinear interpolation strategies for the generation of the fractional sample positions. In an attempt to reduce aliasing, the H.264 standard (or JVT or MPEG4 AVC) uses a 6 tap Wiener interpolation filter, with filter coefficients (1, −5, 20, 20 −5, 1)/32, during the interpolation process down to a ¼ fractional sample position. FIG. 3 illustrates the interpolation process in H.264. Referring to FIG. 3, a non-adaptive 6-tap filter is used to generate sample values at ½ fractional sample position. Then, a non-adaptive bilinear filter filters the samples at the ½ fractional positions to generate sample values at ¼ fractional sample positions. More specifically, for luma, given the samples 'A' to 'U' at full-sample locations (xAL, yAL) to (xUL, yUL), the samples 'a' to 's' at fractional sample positions need to be derived. This is done by first computing the prediction values at half sample positions (aa-hh and b,hj,m and s) by applying the filter mentioned above, while afterwards, the prediction values at quarter sample positions are derived by averaging samples at full and half sample positions. For chroma, on the other hand, bilinear interpolation down to $\frac{1}{8}^{th}$ sample positions is used. However, different video signals may have different non-stationary statistical properties (e.g., aliasing, texture, and motion), and therefore the use of fixed filters may still be insufficient.

Adaptive fractional sample interpolation schemes have been discussed that allow better consideration of aliasing during the interpolation process. Instead of a fixed 6-tap filter as the one used by H.264, additional side information is transmitted for every frame which represents the filter coefficients of the filter that will be used during interpolation. More specifically, an adaptive filter of the form $\{a_1, a_2, a_3, a_3, a_2, a_1\}$ can be used to generate all ½ sample positions, followed by bilinear interpolation for the generation of ¼ samples. Considering the symmetric nature of the above filter, only 3 coefficients ($a_1$, $a_2$, and $a_3$) had to be encoded. This method could be easily extended to allow longer or shorter tap filters.

In another prior technique, instead of coding the coefficients of the filters explicitly, a codebook of filters is generated based on a typical distribution of filter coefficients. This could provide both a decrease in complexity at the encoder (only a given set of coefficients may need to be tested, although one may argue that an a priori decision could also be used to determine an appropriate range of filtering coefficients), but most importantly a somewhat improved/reduced representation of the filtering coefficients (i.e., instead of requiring 3*12 bits to represent the filtering coefficients), one now only needs N bits to represent up to $2^N$ different filters, assuming that all filters have equal probability. Additional considerations may be made by considering different filters at different ½ or ¼ sample positions, which can essentially be seen as an adaptation of the interpolation filter using the sample position as the indicator.

Apart from frame/global based filter adaptation, the possibility of adapting filtering parameters at the block level have been discussed. In one prior technique, for each block, a 4 tap filter is used and transmitted during encoding. Although this method could improve the motion compensated prediction signal, this could not justify the significant increase in terms of bit overhead due to the additional transmission of the filters. Also, mentioned that little correlation is seen between interpolation filters of adjacent blocks. Therefore, this method appears to be impractical and inefficient. However, a Macroblock (MB) based interpolation method may be used which signaled and only considered a predefined set of interpolation filters. A decision of whether to transmit and use these interpolation filters is made at the picture level.

Some global based interpolation methods do not consider the local characteristics of the signal and therefore their performance might be limited. Furthermore, no proper consideration is made in the presence of multiple references such as in bi-prediction. In one prior technique, the interpolation filter for each reference is essentially signaled only once per reference, and the same interpolation is used for subsequent pictures that reference this picture. However, one may argue that for every coded frame, different interpolation filters may be required for all its references, since characteristics of motion, texture etc, and the relationship between references may be changing in time. For example, assuming that a transformation of $P_n = f_{n,k}(P_k)$ is required to generate a picture $P_n$ from its reference $P_k$. $P_k$ on the other hand may have a relationship $P_k = f_{k,j}(P_j)$ with a reference $P_j$ which implies that the use of $f_{k,j}0$ when referencing $P_j$ may not be appropriate. Furthermore, no consideration is made for bi-predicted partitions, for which the uni-prediction interpolation filters might not be appropriated.

On the other hand, block based methods may suffer from either considerably increased overhead for the encoding of the interpolation filters, or lack of flexibility in terms of the filters used. Again, no consideration of bi-prediction is made.

Thus, adaptive interpolation schemes were recently proposed that try to take in account such properties and adapt such interpolation filters for every frame. Such schemes essentially require the transmission of the filtering parameters used for every frame, while also an estimation process of such parameters is also necessary. Unfortunately, the methods presented do no present a best mode of operation for such techniques, therefore resulting in increased overhead and therefore reduced performance. Furthermore, adaptation is essentially performed at a frame (global) level, and no local characteristics are considered.

SUMMARY OF THE INVENTION

A method and apparatus is disclosed herein for video encoding and/or decoding using adaptive interpolation is described. In one embodiment, the decoding method comprises decoding a reference index; decoding a motion vector; selecting a reference frame according to the reference index; selecting a filter according to the reference index; and filtering a set of samples of the reference frame using the filter to obtain the predicted block, wherein the set of samples of the reference frame is determined by the motion vector.

DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1B:
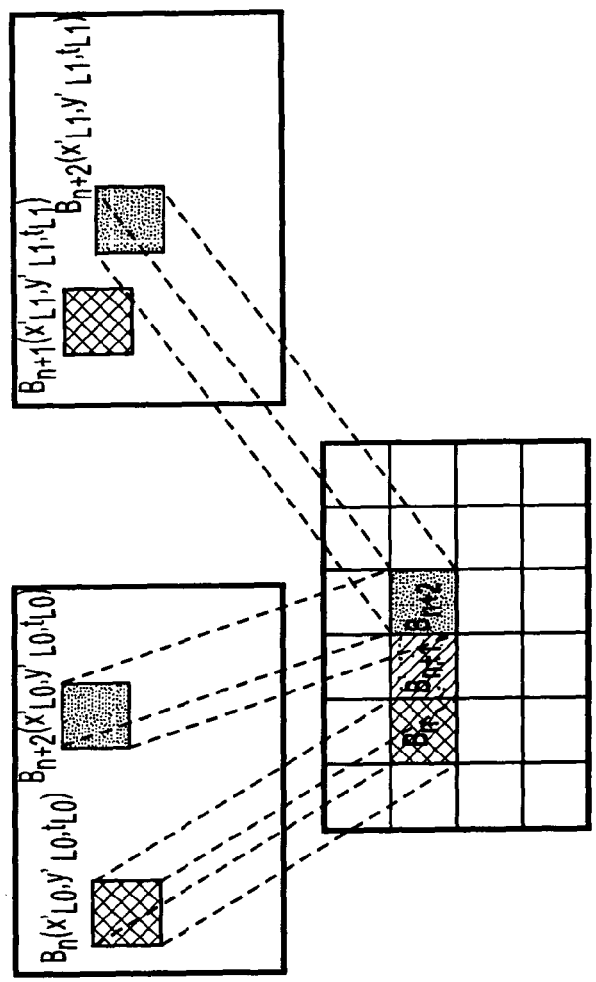
FIG. 1 illustrates motion compensation in (a) P and (b) B pictures.
Figure 1A:
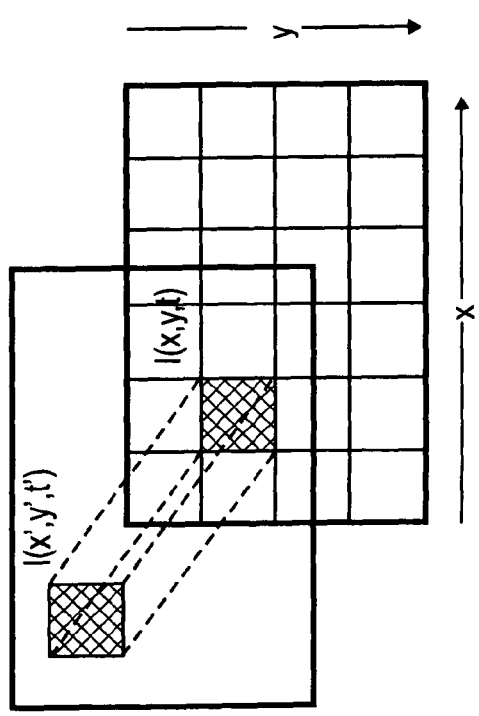
Figure 2:
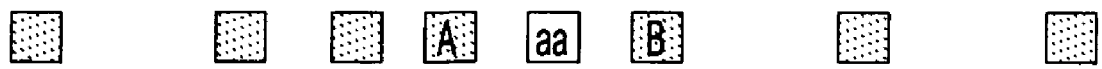
FIG. 2 illustrates integer samples and fractional sample positions for quarter sample luma interpolation.
Figure 2:
Figure 2:
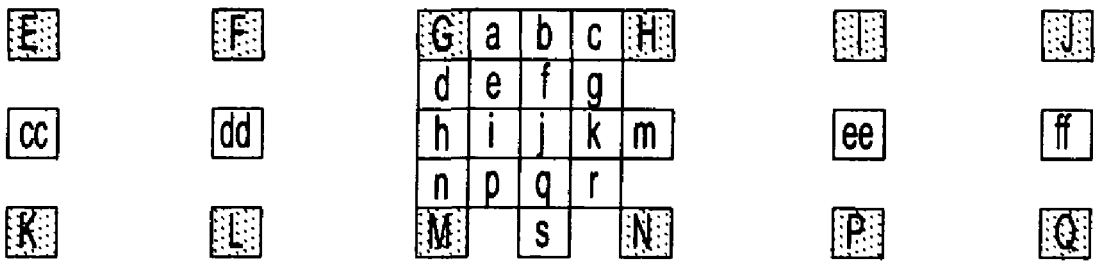
Figure 2:
Figure 2:
Figure 3:
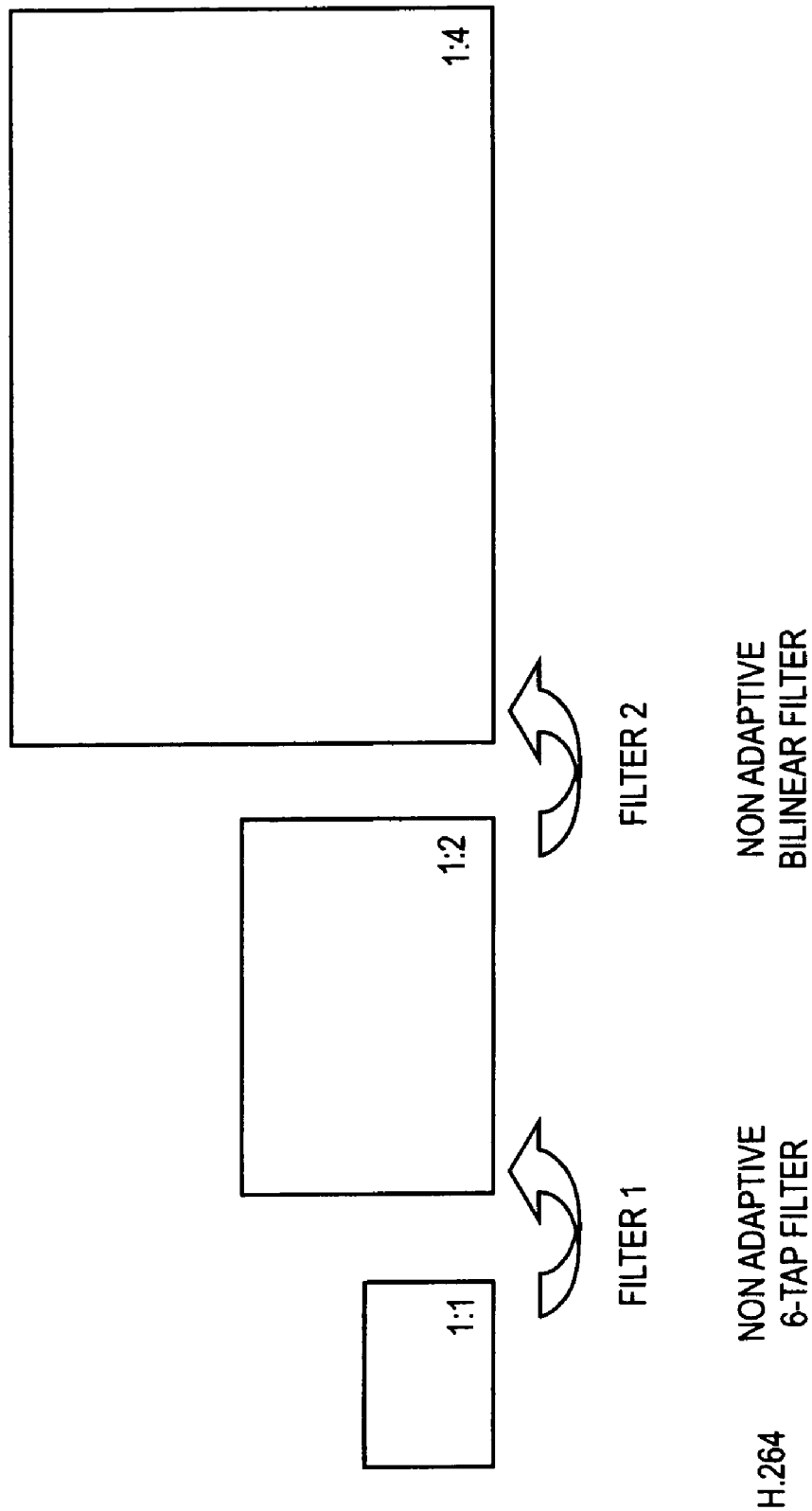
FIG. 3 illustrates the interpolation process used in H.264.

A video encoding and decoding architecture that includes adaptive interpolation filtering is disclosed. Unlike prior work where fractional sample interpolation is performed using a single filtering mechanism, the coding scheme described herein uses an adaptive signaling mechanism where each partition is assigned to a different fractional sample interpolation filter. This could allow for a further improvement in terms of the performance of motion compensated prediction, thereby resulting in increased coding efficiency compared to existing methods or standards. In one embodiment, this is achieved by first associating a reference picture by not only a single reference index but instead multiple indices. Each of these reference indices is then further associated with a different interpolation filtering mechanism, which can either be known to the decoder or explicitly transmitted to the decoder. The selection of the interpolation filter is then based on the reference indicator associated with each block, and no additional signaling is required. The coding scheme discussed herein scheme also allows, up to a certain degree, local adaptation of the filtering method used, and therefore could lead to improved coding efficiency.

In another embodiment, the techniques set forth herein are applied to spatially scalable video coding, where typically in such applications the down-sampling and up-sampling process is considerably affected by phase shift introduced during down-sampling.

Furthermore, the techniques described herein could emulate the behavior of weighted prediction, and even combined with existing weighted prediction methods, thereby further increasing flexibility for prediction purposes.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer programed stored in the computer. Such a computer program may be stored in a computer readable storage medium, such as, but is not limited to, any type of disk including floppy disks, optical disk, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The consideration of adaptive fractional sample interpolation provides significant benefits to motion compensated video coding. This is due to its potentially in leading to improved quality in terms of the prediction signal. Examples of encoding and decoding processes that include the adaptive techniques described herein as given below.

Figure 4:
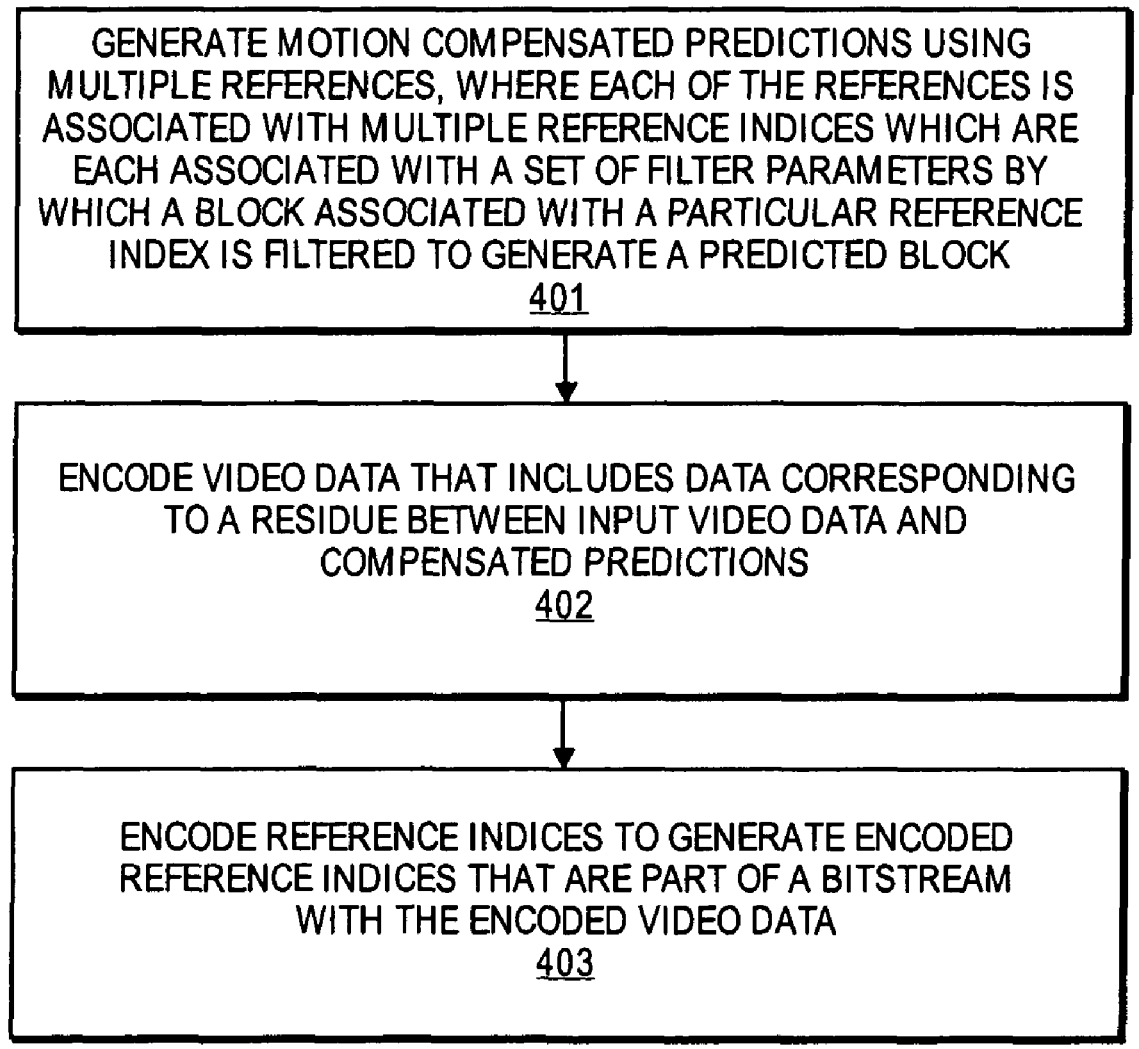
FIG. 4 is a flow diagram of one embodiment of a encoding process.

FIG. 4 is a flow diagram of one embodiment of an encoding process. The process is performed by processing logic that may comprise hardware (circuitry, dedicated logic, etc.), software (such as is run on a general purpose computer system or a dedicated machine), or a combination of both.

Referring to FIG. 4, the process begins by processing logic generating motion compensated predictions using multiple references, where each of the references is associated with one or more reference indices which are each associated with a set of filter parameters by which a block associated with a particular reference index is filtered to generate a predicted block (processing block 401). In one embodiment, the generation of motion compensated predictions is performed by a motion compensation module.

In one embodiment, each partition, or block, in a reference is assigned a reference index corresponding to a different fractional sample interpolation filter. In one embodiment, each set of filter parameters corresponds to an interpolation filter. In such a case, multiple references are associated with multiple sets of filter parameters that correspond to multiple filters. In one embodiment, the interpolation filter is known to a decoder for use in decoding a bitstream containing the encoded video data and encoded reference indices. In another embodiment, the interpolation filter is explicitly transmitted to a decoder for use in decoding a bitstream containing the encoded video data and encoded reference indices.

In one embodiment, the filters include one or more of a 6 tap filter associated with parameters in the form of $\{1, -5, 20, 20, -5, 1\}/32$, a bilinear interpolation filter; and a bicubic interpolation filter. In another embodiment, the filters include one or more 2D filters.

In one embodiment, the interpolation filter is known to both the encoder and a decoder for use in decoding a bitstream containing the encoded video data and encoded reference indices.

In one embodiment, the filtering parameters are also defined for a set of chroma components. The filtering parameters for one chroma component may be determined based on another chroma component.

Using the motion compensated predictions, processing logic encodes video data that includes data corresponding to a residue between input video data and compensated predictions (processing block 402) and encodes reference indices to generate encoded reference indices that are part of a bitstream with the encoded video data (processing block 403). Because each index is associated with filtering parameters, the encoded data identifies the filtering parameters to a decoder. The encoding operation may be performed by a variable length encoder.

Figure 5:
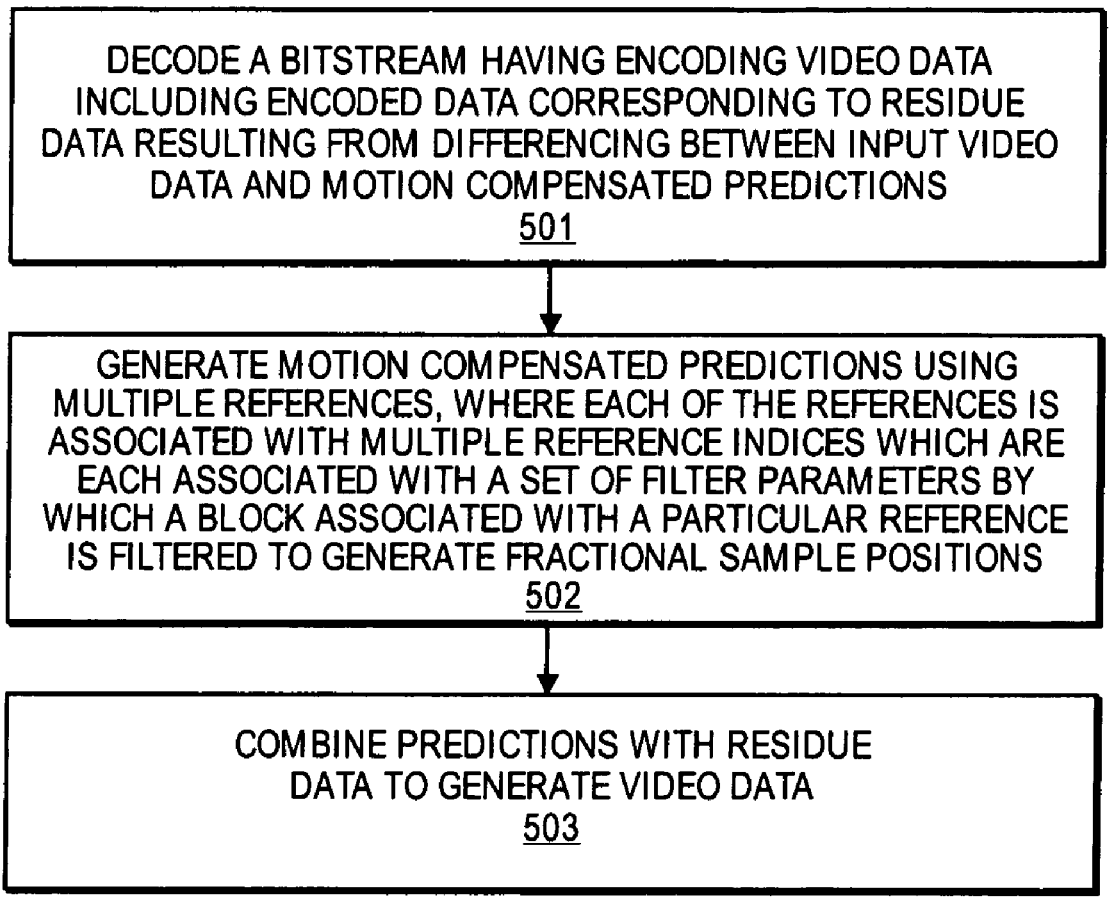
FIG. 5 is a flow diagram of one embodiment of a decoding process.

The decoding operation is the reverse of the encoding operation. FIG. 5 is a flow diagram of one embodiment of an decoding process. The process is performed by processing logic that may comprise hardware (circuitry, dedicated logic, etc.), software (such as is run on a general purpose computer system or a dedicated machine), or a combination of both.

Referring to FIG. 5, the process begins by processing logic decoding a bitstream having encoding video data including encoded data corresponding to residue data resulting from differencing between input video data and motion compensated predictions (processing logic 501). In one embodiment, processing logic also decodes motion vectors and reference indices. The decoding operation may be performed by a variable length decoder.

Next, processing logic generates motion compensated predictions using multiple references, where each of the references is associated with multiple reference indices which are each associated with a set of filter parameters by which a block associated with a particular reference is filtered to generate fractional sample positions (processing block 502). In one embodiment, the generation of motion compensated predictions is performed by a motion compensation module or unit in an encoder.

Afterwards, processing logic combining predictions with residue data to generate video data (processing block 503). The combining operation may be performed by an adder in a decoder.

Figure 6:
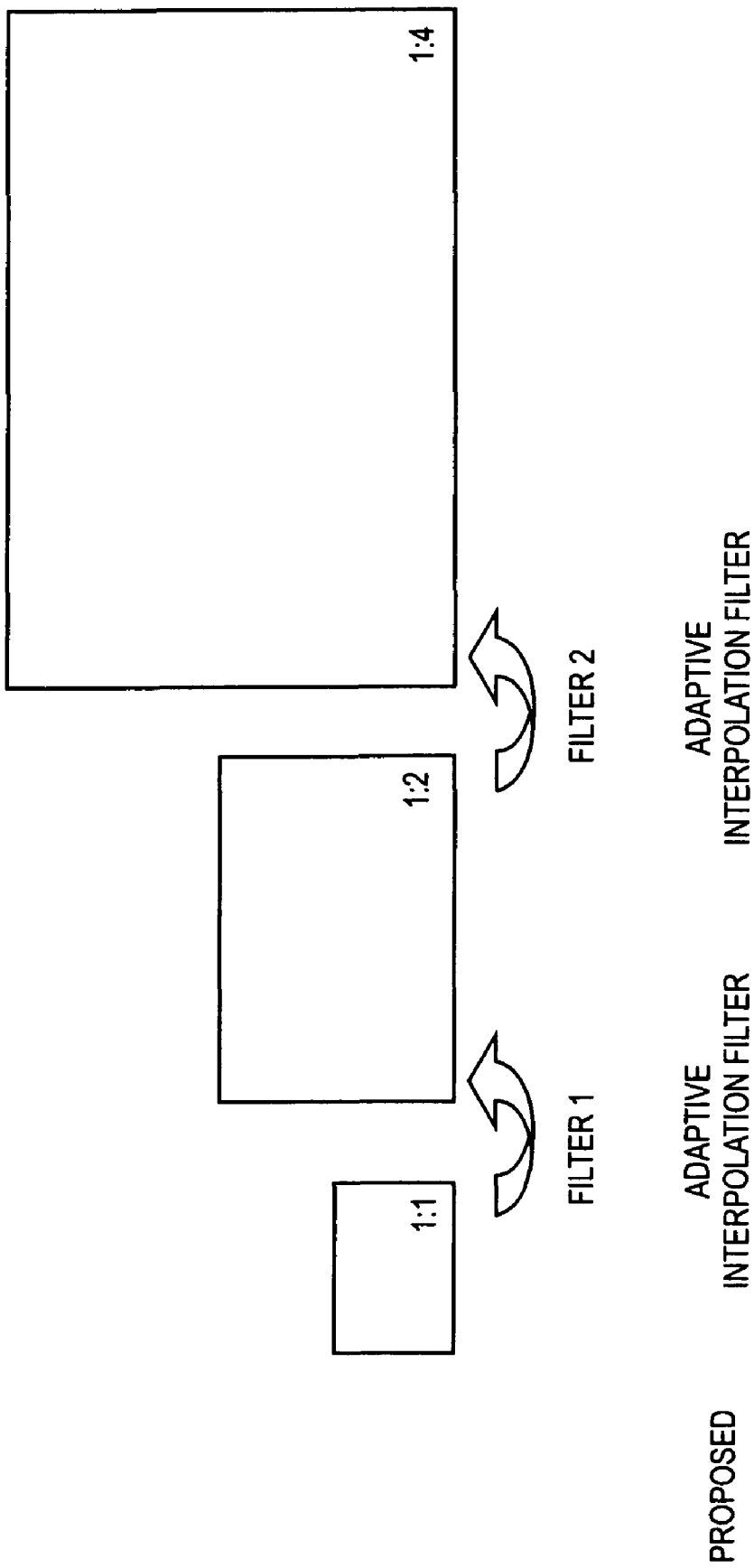
FIG. 6 illustrates one embodiment of an interpolation process.

FIG. 6 illustrates one embodiment of an interpolation process. Referring to FIG. 6, an adaptive filter is used to generate sample values at ½ fractional sample positions. Then, another adaptive bilinear filter filters the samples at the ½ fractional position to generate sample values at ¼ fractional sample positions. Interpolation filter 2 can be equal to filter 1 or bilinear. However, filter 2 could also be completely different from filter 1. If this is the case, additional signaling may be required.

An efficient strategy of how to signal and employ such interpolation methods is described herein.

An Example of Syntax

The H.264 video coding standard provides the flexibility of associating a given reference in the reference store with multiple reference indices. The associated syntax for reference picture list reordering is shown in Table 1 below.

TABLE 1

Reference Picture List Reordering Syntax in H.264

```
ref_pic_list_reordering( ) {                                        C    Descriptor
    if( slice_type != I && slice_type != SI ) {
        Ref_pic_list_reordering_flag_l0                             2    u(1)
        if( ref_pic_list_reordering_flag_l0 )
            do {
                reordering_of_pic_nums_idc                          2    ue(v)
                if( reordering_of_pic_nums_idc = = 0 ||
                        reordering_of_pic_nums_idc = = 1 )
                    abs_diff_pic_num_minus1                         2    ue(v)
                else if( reordering_of_pic_nums_idc = = 2 )
                    long_term_pic_num                               2    ue(v)
            } while( reordering_of_pic_nums_idc != 3 )
    }
    if( slice_type = = B ) {
        ref_pic_list_reordering_flag_l1                             2    u(1)
        if( ref_pic_list_reordering_flag_l1 )
            do {
                reordering_of_pic_nums_idc                          2    ue(v)
                if( reordering_of_pic_nums_idc = = 0 ||
                        reordering_of_pic_nums_idc = = 1 )
                    abs_diff_pic_num_minus1                         2    ue(v)
                else if( reordering_of_pic_nums_idc = = 2 )
                    long_term_pic_num                               2    ue(v)
            } while( reordering_of_pic_nums_idc != 3 )
    }
}
```

This property is exploited within the framework of adaptive fractional sample interpolation. In one embodiment, since such interpolation may not always be useful, a single parameter may be signaled at a higher level (e.g., within the picture or even sequence parameter sets of a codec) which indicates whether interpolation is used or not. For example, the H.264 Picture Parameter Set RBSP syntax may be modified as in Table 2, by introducing an additional element named interpolated_pred_flag. If this element is present, then, in a lower syntax layer, additional interpolation parameters may also be transmitted.

TABLE 2

Picture Parameter Set RBSP syntax
in H.264 with proposed amendment

| pic_parameter_set_rbsp( ) { | C | Descriptor |
|---|---|---|
| pic_parameter_set_id | 1 | ue(v) |
| seq_parameter_set_id | 1 | ue(v) |
| entropy_coding_mode_flag | 1 | u(1) |
| . | | |

TABLE 2-continued

Picture Parameter Set RBSP syntax
in H.264 with proposed amendment

| pic_parameter_set_rbsp( ) { | C | Descriptor |
|---|---|---|
| . | | |
| . | | |
| num_ref_idx_l0_active_minus1 | 1 | ue(v) |
| num_ref_idx_l1_active_minus1 | 1 | ue(v) |
| interpolated_pred_flag | 1 | u(1) |
| weighted_pred_flag | 1 | u(1) |
| weighted_bipred_idc | 1 | u(2) |
| . | | |
| . | | |
| rbsp_trailing_bits( ) | 1 | |
| } | | |

In one embodiment, if the interpolation prediction flag is enabled, an interpolation prediction table (pred_interpolation_table) is signaled. Table 3 contains all the interpolation filter information that will be used for a given reference.

TABLE 3

Slice Header Syntax in H.264 with proposed amendment

| Slice_header( ) { | C | Descriptor |
|---|---|---|
| first_mb_in_slice | 2 | ue(v) |
| slice_type | 2 | ue(v) |
| pic_parameter_set_id | 2 | ue(v) |
| frame_num | 2 | U(v) |
| if( !frame_mbs_only_flag ) { | | |
| field_pic_flag | 2 | u(1) |
| if( field_pic_flag ) | | |
| bottom_field_flag | 2 | u(1) |
| } | | |
| if( nal_unit_type = = 5 ) | | |
| Idr_pic_id | 2 | ue(v) |
| if( pic_order_cnt_type = = 0 ) { | | |
| pic_order_cnt_lsb | 2 | u(v) |

TABLE 3-continued

Slice Header Syntax in H.264 with proposed amendment

| Slice_header( ) { | C | Descriptor |
|---|---|---|
|     if( pic_order_present_flag && !field_pic_flag ) | | |
|         delta_pic_order_cnt_bottom | 2 | se(v) |
|     } | | |
|     if( pic_order_cnt_type = = 1 && | | |
| !delta_pic_order_always_zero_flag ) { | | |
|         delta_pic_order_cnt[ 0 ] | 2 | se(v) |
|         if( pic_order_present_flag && !field_pic_flag ) | | |
|             delta_pic_order_cnt[ 1 ] | 2 | se(v) |
|     } | | |
|     if( redundant_pic_cnt_present_flag ) | | |
|         redundant_pic_cnt | 2 | ue(v) |
|     if( slice_type = = B ) | | |
|         direct_spatial_mv_pred_flag | 2 | u(1) |
|     if( slice_type = = P || slice_type = = SP || slice_type = = B ) { | | |
|         num_ref_idx_active_override_flag | 2 | u(1) |
|         if( num_ref_idx_active_override_flag ) { | | |
|             num_ref_idx_l0_active_minus1 | 2 | ue(v) |
|             if( slice_type = = B ) | | |
|                 num_ref_idx_l1_active_minus1 | 2 | ue(v) |
|         } | | |
|     } | | |
|     ref_pic_list_reordering( ) | 2 | |
|     if( ( weighted_pred_flag && ( slice_type = = P || slice_type = = SP ) ) || | | |
|         ( weighted_bipred_idc = = 1 && slice_type = = B ) ) | | |
|         pred_weight_table( ) | 2 | |
|     if( ( interpolated_pred_flag && | | |
|         ( slice type = = P || slice_type = = SP || slice_type = = B) ) | | |
|         pred_interpolation_table( ) | 2 | |
|     if( nal_ref_idc != 0 ) | | |
|         dec_ref_pic_marking( ) | 2 | |
|     if( entropy_coding_mode_flag && slice_type != I && | | |
| slice_type != SI ) | | |
|         cabac_init_idc | 2 | ue(v) |
|     slice_qp_delta | 2 | se(v) |
|     if( slice_type = = SP || slice_type = = SI ) { | | |
|         if( slice_type = = SP ) | | |
|             sp_for_switch_flag | 2 | u(1) |
|         slice_qs_delta | 2 | se(v) |
|     } | | |
|     if( deblocking_filter_control_present_flag ) { | | |
|         disable_deblocking_filter_idc | 2 | ue(v) |
|         if( disable_deblocking_filter_idc != 1 ) { | | |
|             slice_alpha_c0_offset_div2 | 2 | se(v) |
|             slice_beta_offset_div2 | 2 | se(v) |
|         } | | |
|     } | | |
|     if( num_slice_groups_minus1 > 0 && | | |
|         slice_group_map_type >= 3 && slice_group_map_type <= 5) | | |
|         slice_group_change_cycle | 2 | u(v) |
| } | | |

The prediction interpolation table syntax in Table 4 contains all the interpolation information for every reference within every reference list (list0 and list1). More specifically, this could include the type of the interpolation filter (luma_interpolation_lX_type), whether this filter would be applied for ½-pel positions only and the bilinear would be used for ¼-pel positions (as in FIG. 6) or whether the filter would be applied for all samples (luma_interpolation_lX_qpel), the number of filter taps (luma_filter_length_lX or luma_2Dfilter_length_lX), the filter precision (luma_filter_denom_lX and luma_filter_2Ddenom_lX), and the actual filter coefficients (luma_filter_tap_lX and luma_2Dfilter_coeffs_lX). In one embodiment, the filter coefficients are variable length coded (i.e. ue(v)). In another embodiment, the filter coefficients are fixed length coded (u(N) i.e. with N=8). Furthermore, in yet another embodiment, the prediction of their value is selected for example versus the H.264 default interpolation filter, and therefore they may be more efficiently coded if differentially encoding is used.

Similar syntax can exist for both lists, but also for chroma components if available (e.g., if chroma_format_idc is not 0 which would indicate a monochrome sequence). Additional elements could also be present that would separate bi-predictive from uni-predictive interpolation filters, although one could also emulate this behavior again through the reordering syntax (i.e. the same reference may be associated with 2 different reference indices), for which one would be associated with uni-predictive interpolation filters, while the bi-predictive weighs would be associated with the other.

TABLE 4

Proposed Prediction Interpolation Table Syntax

| | C | Descriptor |
|---|---|---|
| pred_interpolation_table( ) { | | |
| //! Interpolation scemantics for list0 | | |
|     for( i = 0; i <= num_ref_idx_l0_active_minus1; i++ ) { | | |
|         luma_interpolation_l0_type[ i ] | 2 | ue(v) |
| //! If not bicubic, select whether filter is to be applied also for ¼ pel | | |
|         if(luma_interpolation_l0_type != 1 && luma_interpolation_l0_type != 2) | | |
|           luma_interpolation_l0_qpel[ i ] | 2 | u(1) |
| //! If type 3, explicitly send separable filter coefficients | | |
|         if(luma_interpolation_l0_type == 3 ) { | | |
|           luma_filter_length_l0[ i ] | 2 | ue(v) |
|           luma_filter_denom_l0[ i ] | 2 | ue(v) |
|           for( j = 0; j <= luma_filter_length_l0[ i ]; j++ ) | | |
|             luma_filter_tap_l0[ i ][ j ] | 2 | se(v) |
|         } else if( luma_interpolation_l0_type == 4 ) { | | |
| //! If type 4, 2D 6tap filter requiring 54 coefficients is used | | |
|           luma_2Dfilter_length_l0[ i ] | 2 | ue(v) |
|           luma_2Dfilter_denom_l0[ i ] | 2 | ue(v) |
|           for( j = 0; j <= 54; j++ ) | | |
|             luma_2Dfilter_coeffs_l0[ i ][ j ] | 2 | se(v) |
|         } | | |
|     } | | |
|     for (k=0; k < chroma_format_idc ? 2 : 0; k++) { | | |
|         chroma_interpolation_l0_type[ i ][ k ] | 2 | ue(v) |
| //! If not bicubic, select whether filter is to be applied also for ¼ pel | | |
|         if(chroma_interpolation_l0_type >2 ) | | |
|           chroma_interpolation_l0_qpel[ I ][ k ] | 2 | u(1) |
| //! If type 3, explicitly send separable filter coefficients | | |
|         if(chroma_interpolation_l0_type == 3 ) { | | |
|           chroma_filter_length_l0[ i ][ k ] | 2 | ue(v) |
|           chroma_filter_denom_l0[ i ][ k ] | 2 | ue(v) |
|           for( j = 0; j <= chroma_filter_length_l0[ i ][ k ]; j++ ) | | |
|             chroma_filter_tap_l0[ i ][ k ][ j ] | 2 | se(v) |
|         } else if(chroma_interpolation_l0_type == 4 ) { | | |
| //! If type 4, 2D 6tap filter requiring 54 coefficients is used | | |
|           chroma_2Dfilter_length_l0[ i ] | 2 | ue(v) |
|           chroma_2Dfilter_denom_l0[ i ][ k ] | 2 | ue(v) |
|           for( j = 0; j <= 54; j++ ) | | |
|             chroma_2Dfilter_coeffs_l0[ i ][ j ] | 2 | se(v) |
|         } | | |
|     } | | |
|     If( slice_type = = B ) { | | |
|         for( i = 0; i <= num_ref_idx_l1_active_minus1; i++ ) { | | |
|           luma_interpolation_l1_type[ i ] | 2 | ue(v) |
| //! If not bicubic, select whether filter is to be applied also for ¼ pel | | |
|         if(luma_interpolation_l1_type !=1 && luma_interpolation_l1_type != 2) | | |
|           luma_interpolation_l1_qpel[ i ] | 2 | u(1) |
| //! If type 3, explicitly send separable filter coefficients | | |
|         if(luma_interpolation_l1_type == 3 ) { | | |
|           luma_filter_length_l1[ i ] | 2 | ue(v) |
|           luma_filter_denom_l1[ i ] | 2 | ue(v) |
|           for( j = 0; j <= luma_filter_length_l1[ i ]; j++ ) | | |
|             luma_filter_tap_l1[ i ][ j ] | 2 | se(v) |
|         } else if(luma_interpolation_l1_type == 4 ) { | | |
| //! If type 4, 2D 6tap filter requiring 54 coefficients is used | | |
|           luma_2Dfilter_length_l1[ i ] | 2 | ue(v) |
|           luma_2Dfilter_denom_l1[ i ] | 2 | ue(v) |
|           for( j = 0; j <= 54; j++ ) | | |
|             luma_2Dfilter_coeffs_l1[ i ][ j ] | 2 | se(v) |
|         } | | |
|         for (k=0; k < chroma_format_idc ? 2 : 0; k++) { | | |
|           chroma_interpolation_l1_type[ i ][ k ] | 2 | ue(v) |
| //! If not bicubic, select whether filter is to be applied also for ¼ pel | | |
|           if(chroma_interpolation_l1_type > 2 ) | | |
|             chroma_interpolation_l1_qpel[ i ][ k ] | 2 | u(1) |
| //! If type 3, explicitly send separable filter coefficients | | |
|           if(chroma_interpolation_l1_type == 3 ) { | | |
|             chroma_filter_length_l1[ i ][ k ] | 2 | ue(v) |
|             chroma_filter_denom_l1[ i ][ k ] | 2 | ue(v) |
|             for( j = 0; j <= chroma_filter_length_l1 [ i ][ k ]; j++ ) | | |
|               chroma_filter_tap_l1[ i ][ k ][ j ] | 2 | se(v) |
|           } else if(chroma_interpolation_l1_type == 4 ) { | | |
| //! If type 4, 2D 6tap filter requiring 54 coefficients is used | | |

TABLE 4-continued

Proposed Prediction Interpolation Table Syntax

| pred_interpolation_table( ) { | C | Descriptor |
|---|---|---|
|         chroma_2Dfilter_length_l1[ i ] | 2 | ue(v) |
|         chroma_2Dfilter_denom_l1[ i ][ k ] | 2 | ue(v) |
|         for( j = 0; j <= 54; j++ ) | | |
|             chroma_2Dfilter_coeffs_l1[ i ][ j ] | 2 | se(v) |
|       } | | |
|     } | | |
|   } | | |
| } | | |

One element of the above table is the filter type (i.e. luma_interpolation_lX_type). This element indicates one of a wide range of possible interpolation filters. Being able to specify a wide range of interpolation filters provides additional flexibility in terms of the interpolation performed. In one embodiment, for luma, the interpolation mechanisms used are set forth in Table 5 below.

TABLE 5

Scemantis of luma_interpolation_lX_type

| luma_interpolation_lX_type | Filter Method |
|---|---|
| 0 | H.264 6 tap filter |
|  | (i.e. {1 −5 20 20 −5 1}/32) |
| 1 | Bicubic |
|  | (i.e. as the one used by WM9/VC1) |
| 2 | Bilinear |
| 3 | N-tap separable filter |
|  | (needs not be a symmetric filter) |
| 4 | 2D filter |

Similar considerations could be made for chroma, although, in one embodiment, to specify that both components may use different or the same interpolation mechanisms (i.e. this could be signaled for the second component using chroma_interpolation_lX_type). In another embodiments, others filters more appropriate for chroma may be used, particularly with emphasis on the fact that interpolation may be done down to a $\frac{1}{8}^{th}$ pel level. For example, in one embodiment, for the first chroma component the semantic of chroma_interpolation_lX_type is given in Table 6.

TABLE 6

Scemantics of chroma_interpolation_lX_type[i][0]

| chroma_interpolation_lX_type[i][0] | Filter Method |
|---|---|
| 0 | Bilinear (default H.264) |
| 1 | H.264 luma 6 tap filter |
|  | (i.e. {1 −5 20 |
|  | 20 −5 1}/32) |
| 2 | Bicubic |
|  | (i.e. as the one |
|  | used by WM9/VC1) |
| 4 | N-tap separable filter |
|  | (needs not be a |
|  | symmetric filter) |
| 5 | 2D filter | while for the second component chroma_interpolation_lX_type[i][1]=0 indicates that the filter of the first component is being reused. In one embodiment, the assignment is given in Table 1, of possibly adjust the table based on its first entry.

TABLE 1

Scemantics of chroma_interpolation_lX_type[i][1]

| Chroma_interpolation_lX_type[i][1] | Filter Method |
|---|---|
| 0 | =chroma_interpolation_lX_type[i][0] |
| 1 | Bilinear |
| 2 | H.264 luma 6 tap filter (i.e. {1 −5 20 20 −5 1}/32) |
| 4 | Bicubic (i.e. as the one used by WM9/VC1) |
| 5 | N-tap separable filter (needs not be a symmetric filter) |
| 6 | 2D filter |

Alternative Embodiments

In one embodiment, the technique described herein provides an alternative method of signaling weighted prediction parameters. This could even further be combined with the exiting weighting parameters supported by codecs such as H.264 (i.e. use of also implicit weighting as well as adaptive interpolation filters), and provide further flexibility and improved efficiency in terms of motion compensated prediction. The basic structure of an encoder and decoder remains similar to conventional encoders and decoders (FIGS. 7 and 8).

Figure 7:
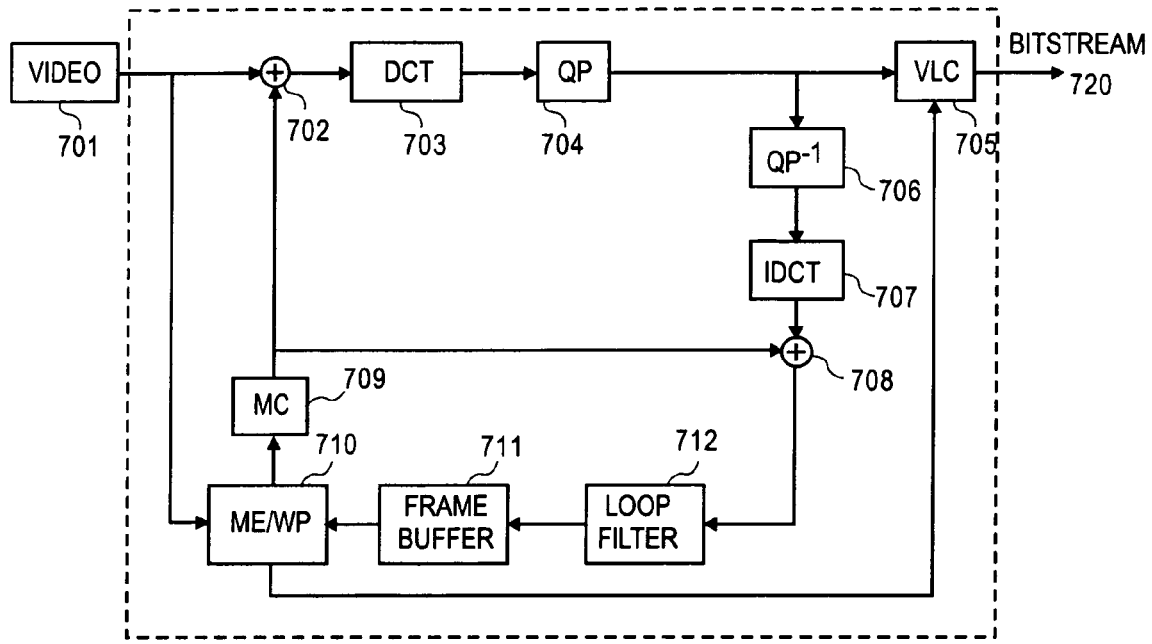
FIG. 7 is another embodiment of an encoder.
Figure 8:
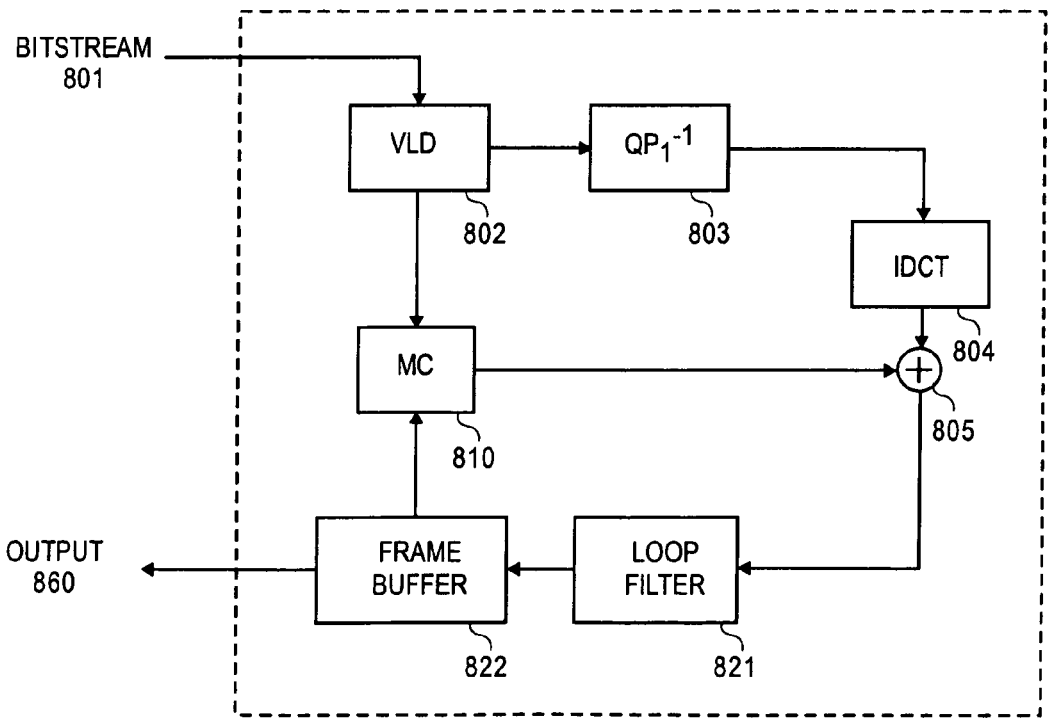
FIG. 8 is another embodiment of a decoder.

FIG. 7 is a block diagram of one embodiment of an encoder. In one embodiment corder first divides the incoming bitstream into rectangular arrays, referred to as marcroblocks. For each macroblock, the encoder then chooses whether to use intra-frame or inter-frame coding. Intra-frame coding uses only the information contained in the current video frame and produces a compressed result referred to as an I-frame. Intra-frame coding can use information of one or more other frames, occurring before or after the current frame. Compressed results that only use data from previous frames are called P-frames, while those that use data from both before and after the current frame are called B-frames.

Referring to FIG. 7, video 701 is input into the encoder. In the case of encoding a frame without motion compensation, frames of video are input into DCT 703. DCT 703 performs a 2D discrete cosign transform (DCT) to create DCT coefficients. The coefficients are quantized by quantizer 704. In one embodiment, the quantization performed by quantizer 704 is weighted by scaler, QP. In one embodiment, the quantizer scaler parameter QP takes values from 1 to 31. The QP value can be modified in both picture and macroblock levels.

Thereafter, the quantized coefficients undergo variable length encoding at VLC 705, which generates bitstream 720. In one embodiment, VLC 705 performs entropy coding by using one symbol to represent a triplet (last, run, level) in entropy coding stage such as Huffman coding.

Note that, in one embodiment, prior to VLC 705, reordering may be performed in which quantized DCT coefficients are zigzagged scanned so that a 2D array of coefficients is converted into a ID array of coefficients in a manner well-known in the art. This may be followed by run length encoding in which the array of reordered quantized coefficients corresponding to each block is encoded to better represent zero coefficients. In such a case, each nonzero coefficient is encoded as a triplet (last, run, level), where "last" indicates whether this is the final nonzero coefficient in the block, "run" signals the preceeding 0 coefficients and "level" indicates the coefficients sign and magnitude.

A copy of the frames may be saved for use as a reference frame. This is particularly the case of I or P frames. To that end, the quantized coefficients output from quantizer 704 are inverse quantized by inverse quantizer 706. An inverse DCT transform is applied to the inverse quantized coefficients using IDCT 707. The resulting frame data is added to a motion compensated predication from motion compensation (MC) unit 709 in the case of a P frame and then the resulting frame is filtered using loop filter 712 and stored in frame buffer 711 for use as a reference frame. In the case of I frames, the data output from IDCT 707 is not added to a motion compensation prediction from MC unit 709 and is filtered using loop filter 712 and stored in frame buffer 711.

In the case of a P frame, the P frame is coded with inter-prediction from previous a I or P frame, which is referred to commonly in the art as the reference frame. In this case, the interprediction is performed by motion estimation (ME) block 710 and motion compensation unit 709. In this case, using the reference frame from frame store 711 and the input video 701, motion estimation unit 710 searches for a location of a region in the reference frame that best matched the current macro block in the current frame. The motion vectors for motion estimation unit 710 are sent to motion compensation unit 709. At motion compensation unit 709, the prediction is subtracted from the current macroblock to produce a residue macroblock using subtractor 702. The residue is then encoded using DCT 703, quantizer 704 and VLC 705 as described above.

Motion estimation unit 710 outputs the weighting parameters to VLC 705 for variable length encoding 705. The output of VLC 705 is bitstream 720.

FIG. 8 is a block diagram of one embodiment of a decoder. Referring to FIG. 8, bitstream 801 is received by variable length decoder 802, which performs variable length decoding. The output of variable length decoding is sent to inverse quantizer 803, which performs an inverse quantization operation that is the opposite of the quantization performed by quantizer 704. The output of inverse quantizer 803 comprise coefficients that are inverse DCT transformed by IDCT 804 to produce image data. In the case of I frames, the output of IDCT 804 is filtered by loop filter 821, stored in frame buffer 822 and eventually output as output 860. In the case of P frames, the image data output from IDCT 804 is added to the prediction from motion compensation unit 810 using adder 805. Motion compensation unit 810 uses the output from variable length decoder 822, which includes the weighting parameters discussed above, as well as reference frames from frame buffer 822. The resulting image data output from adder 805 is filtered using loop filter 821 and stored in frame buffer 822 for eventual output as part of output 860.

Figure 9:
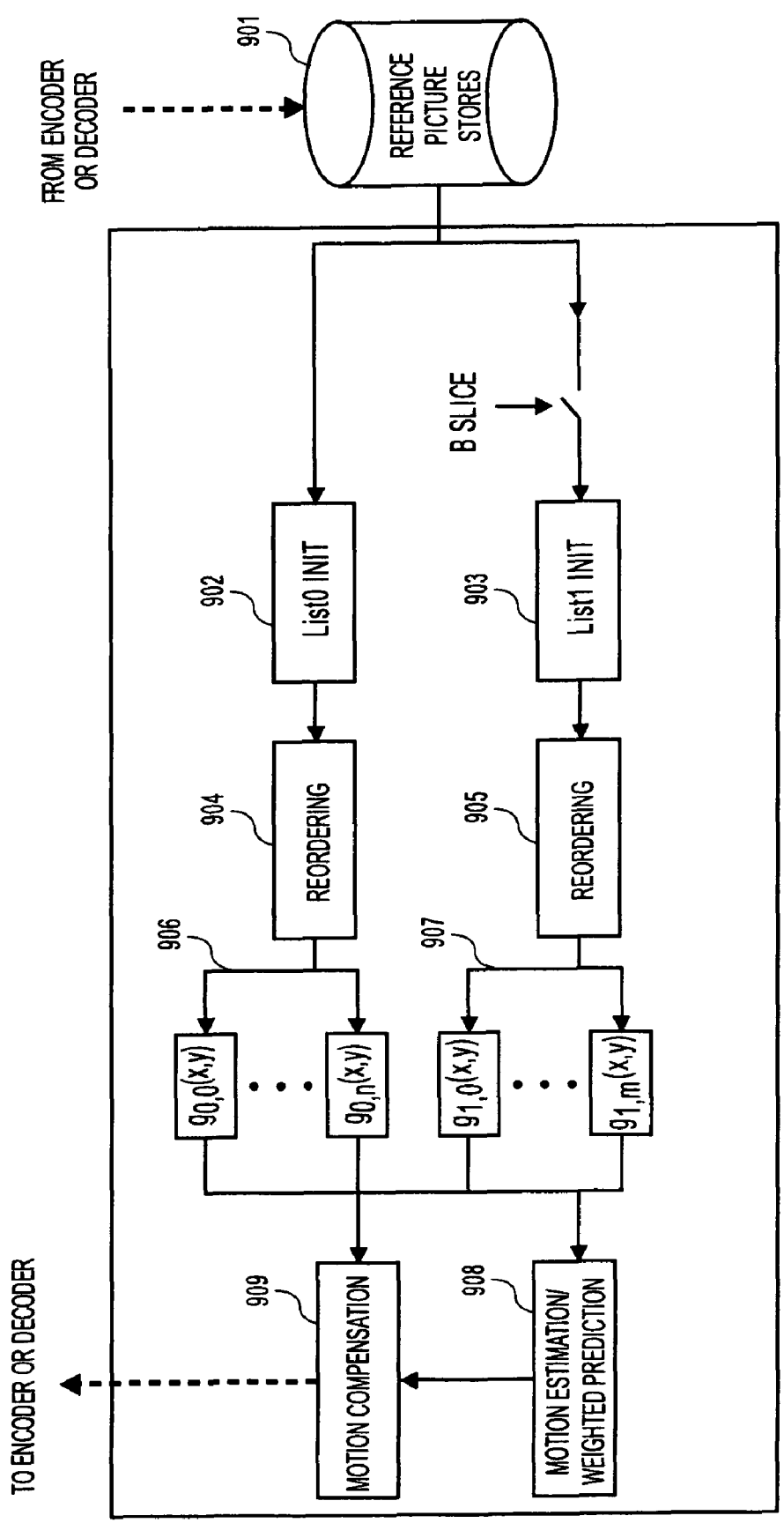
FIG. 9 illustrates an impact on reference list usage an interpolation process.

However, key differences exist on how the reference lists are handled and how the processed of motion estimation and compensation are performed since such may now consider different/multiple interpolation mechanisms and not only a single one. FIG. 9 illustrates the impact on reference list usage as part of the encoder and/or decoder. The references are first organized and processed prior to consideration for motion estimation and motion compensation.

Referring to FIG. 9, the reference pictures are stored in memory 901. The reference pictures are received from the encoder or decoder. List0 and List1 are initialized using the reference pictures stored in memory 901. In one embodiment, the initialization that is performed is that of the H.264 Standard that is well-known in the art. Note that List1 is initialized when B slices are used in the motion estimation and compensation. After initialization, the references in List0 and List 1 are reordered using reordering module 904 and 905, respectively. In one embodiment, reordering is performed such that most frequently used reference indices are at the beginning of list. Again, this reordering is performed according to the H.264 Standard and is well known in the art After reordering, each of the references in the reorder List0 are subjected to a series of functions 906. Similarly, the references in List1 are subjected to a series of functions 907. The resulting outputs from functions 906 and 907 are sent to motion estimation module 908 and motion compensation module 909. (Note that for purposes herein a module may be hardware, software, firmware, or a combination of all.) Motion compensation module 909 uses the outputs of these functions 906 and 907 along with the output of motion estimation module 908 to perform the generated motion compensation prediction for the encoder and decoder. Note that respect to the decoder, no motion estimation element is included this as the motion information is directly available from the bit stream.

In one embodiment, the techniques detailed herein are applied to spatially scalable video coding. In such a case, instead of specifying only a single mechanism for interpolating the base, lower resolution, layer this is used for predicting the current, higher resolution, layer, one may assign a complete set of interpolation methods using reordering commands to a given low resolution reference. This generates a new set of reference pictures, each of which is associated with a different reference index and interpolation filter. At the block level, the reference index may again indicate the interpolation method that is to be used for upsampling without requiring any additional overhead.

Figure 12:
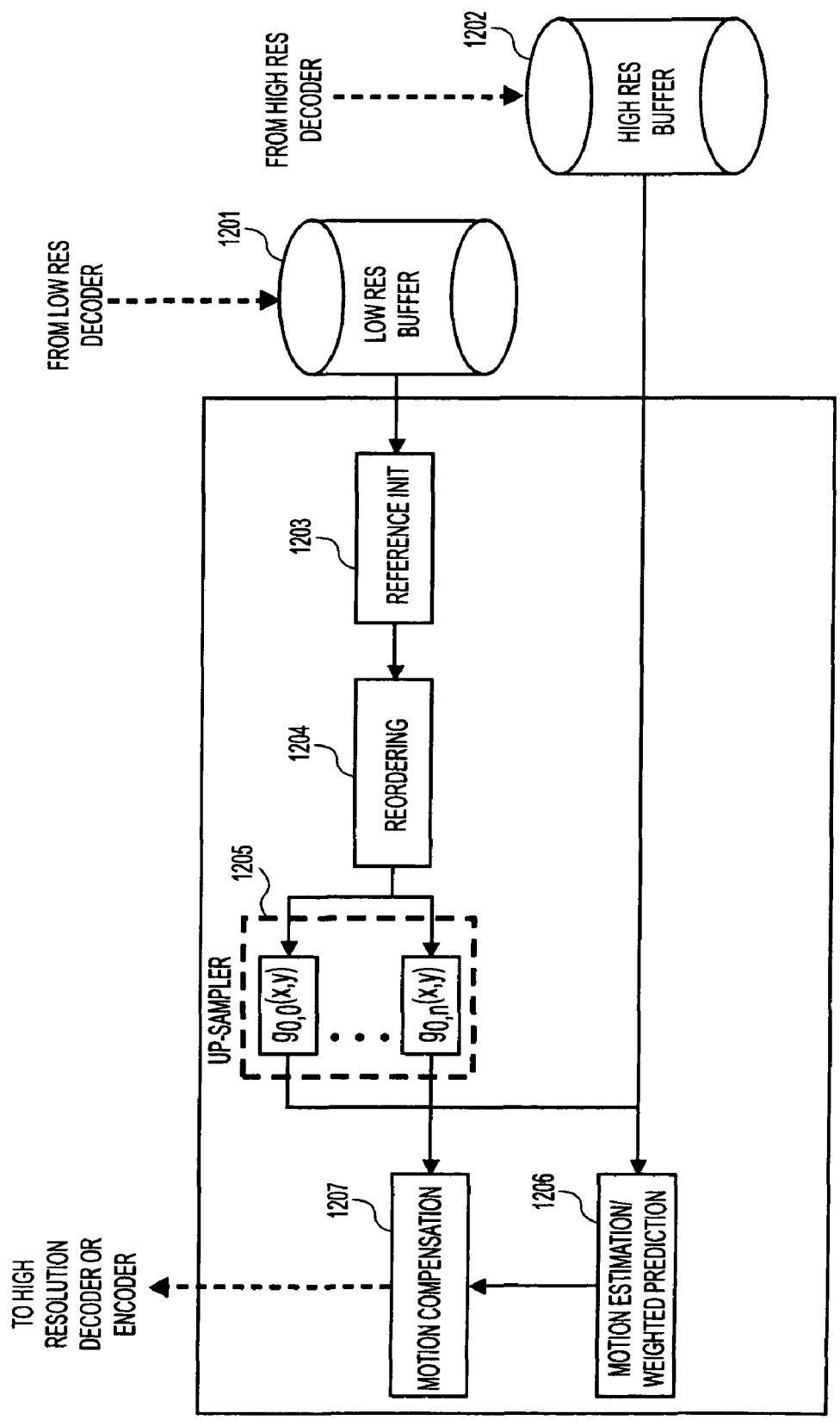
FIG. 12 illustrates consideration of adaptive interpolation for spatial scalability.

FIG. 12 illustrates adaptive interpolation for spatial scalability. Referring to FIG. 12, low resolution buffer 1201 receives layers from a low resolution decoder (not shown). High resolution buffer receives high resolution layers from a high resolution decoder (not shown). Low resolution layers from low resolution buffer 1201 are used to initialize a reference if the reference initialization module 1203. Reordering module 1204 assigns a set of interpolation methods to the references using reordering commands. In one embodiment, this is done as set forth in the H.264 Standard. Thereafter, the layers output from reordering module 1204 are upsampled using upsampler 1205. Upsampler 1205 applies a set of functions $g_{0,0}(x,y)$-$g_{0,n}(x,y)$. The base layer of lower resolution is interpolated and used by motion compensation module 1207 in conjunction with motion estimation module 1206, to predict the current layer of higher resolution. The motion compensation prediction is sent to the higher resolution decoder (or encoder).

Figure 10A:
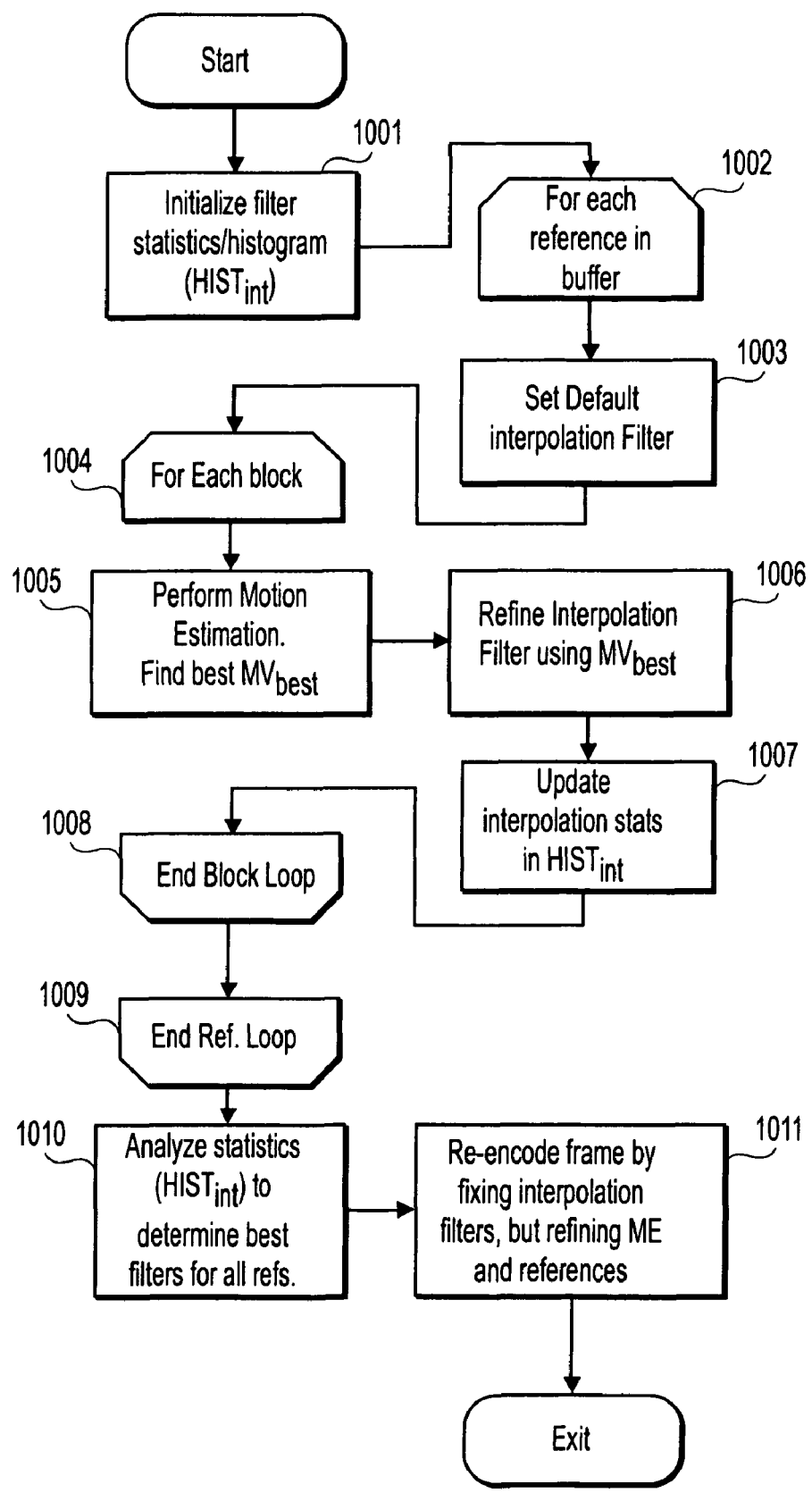
FIGS. 10A and 10B are flow diagrams of alternative embodiments of a process for determining interpolation parameters.

Interpolation filters may be selected by performing a multipass strategy or by considering certain characteristics of the content to be coded. In one embodiment, an estimate of an initial set of displacement vectors is made using an initial filter. Then filter coefficients are estimated for each block by minimizing (or reducing) the energy of the prediction error when performing motion compensated prediction using these displacement vectors. The filters are then sorted based on a histogram approach, refined if necessary, and then the best N filters are selected for signaling and the final encoding. FIG. 10A is a flow diagram of one embodiment of a process for determining interpolation parameters. The process is performed by processing logic that may comprise hardware (circuitry, dedicated logic, etc.), software (such as is run on a general purpose computer system or a dedicated machine), or a combination of both.

Referring to FIG. 10A, the process begins by processing logic initializing filter statistics (processing block 1001). In one embodiment, initializing filter statistics comprises initializing a histogram ($HIST_{INT}$). In one embodiment, the statistics account for how many times each filter was selected. Next, processing logic enters a loop (processing block 1002). In the loop, processing logic sets the default interpolation filter for each reference in the buffer (processing block 1003) and enters another loop in which, for each block, processing logic performs motion estimation (processing block 1005), refines the interpolation filter using the best motion vector (processing block 1006), and updates the interpolation statistics in the histogram $HIST_{INT}$ (processing block 1007). The result to the motion estimation is that the best motion vector ($MV_{best}$) is located.

After processing each block for each reference in the buffer, processing logic transitions to processing block 1010 where processing logic analyzes statistics to determine the best filters for the all the references. In one embodiment, processing logic looks at the $HIST_{INT}$ to determine the best filter for all the references. Then processing logic re-encodes frames by fixing interpolation filters (processing block 1011). In one embodiment, as part of the process of re-encoding the frames, processing logic refines the motion estimation and the references. Thereafter the process ends.

Figure 10B:
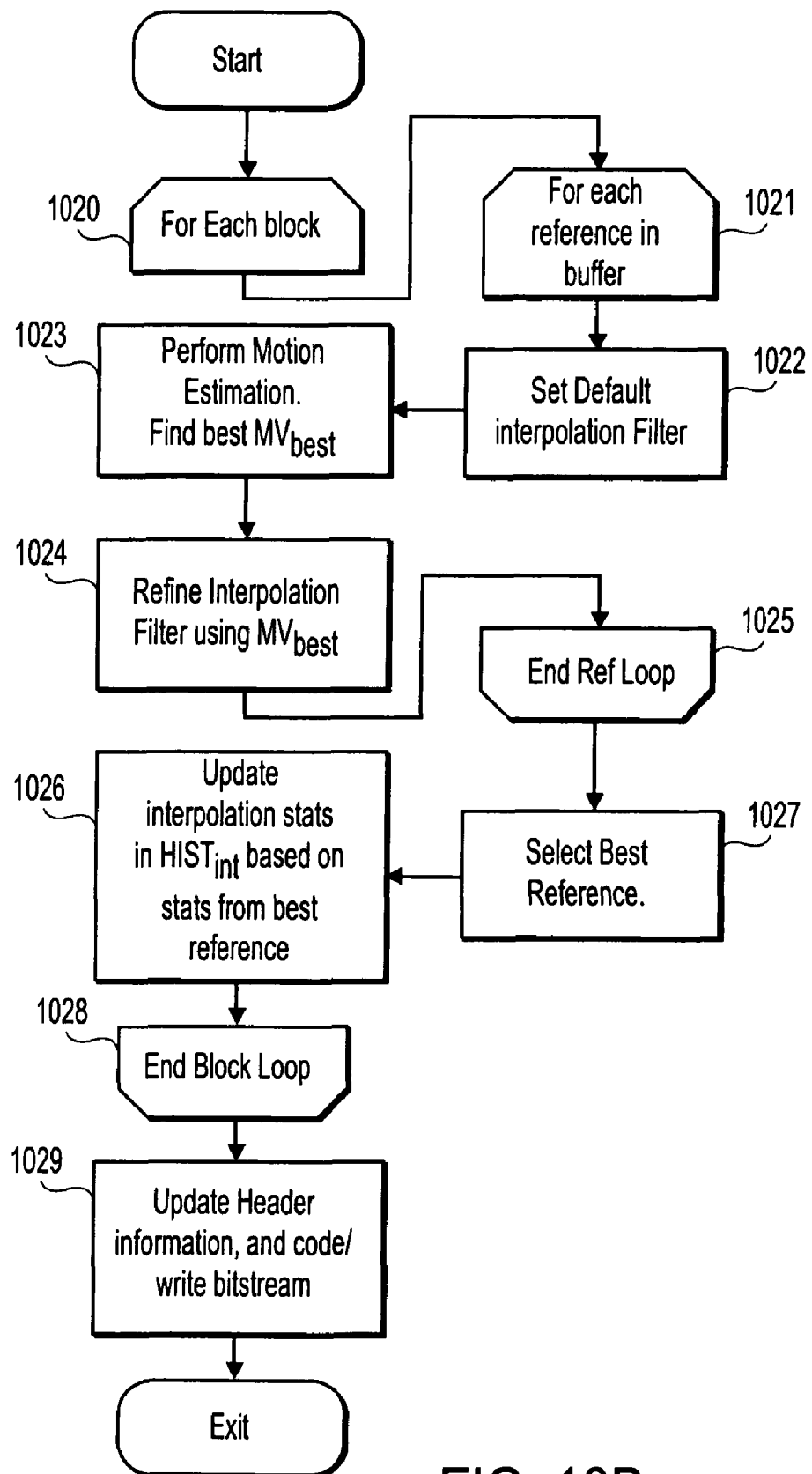

In an alternative embodiment, which may also have lower complexity cost, motion estimation is performed for every block considering every reference. Using the best motion vector from every reference the best interpolation filter for that reference is also found. However, only the parameters from the best reference are considered, while all others can be discarded avoiding therefore any additional processing that may be required. FIG. 10B is a flow diagram of an alternative embodiment for determining interpolation parameters. The process is performed by processing logic that may comprise hardware (circuitry, dedicated logic, etc.), software (such as is run on a general purpose computer system or a dedicated machine), or a combination of both.

Referring to FIG. 10B, the process begins with a loop in which each block is processed (processing block 1020). In the loop, processing logic begins processing another, inner, loop (processing block 1021) in which for each reference in the buffer, processing logic sets the default interpolation filter (processing block 1022), performs motion estimation to find the best motion vector ($MV_{best}$) (processing block 1024) and refines the interpolation filter using the best motion vector ($MV_{best}$) (processing block 1024). Once all references in the buffer have been processed, the inner loop ends.

Thereafter, processing continues in the outer loop where processing logic selects the best reference (processing block 1027) and updates the interpolation stats in the $HIST_{INT}$ based on stats from the best reference (processing block 1026). The outer loop continues until each block is processed, after which the outer loop ends (processing block 1028). Once each block has been processed, processing logic updates the header information and encodes and/or writes the bitstream (processing block 1029).

Further constraints on the interpolation filters could also be imposed (i.e. maximum number of allowed filters per reference, consideration of a penalty for every new filter introduced etc), which may further help in terms of determining the best filter. On the decoder end, one may immediately determine the interpolation filter based on the reference index and perform interpolation accordingly without having any impact on any other decoding process.

Figure 11:
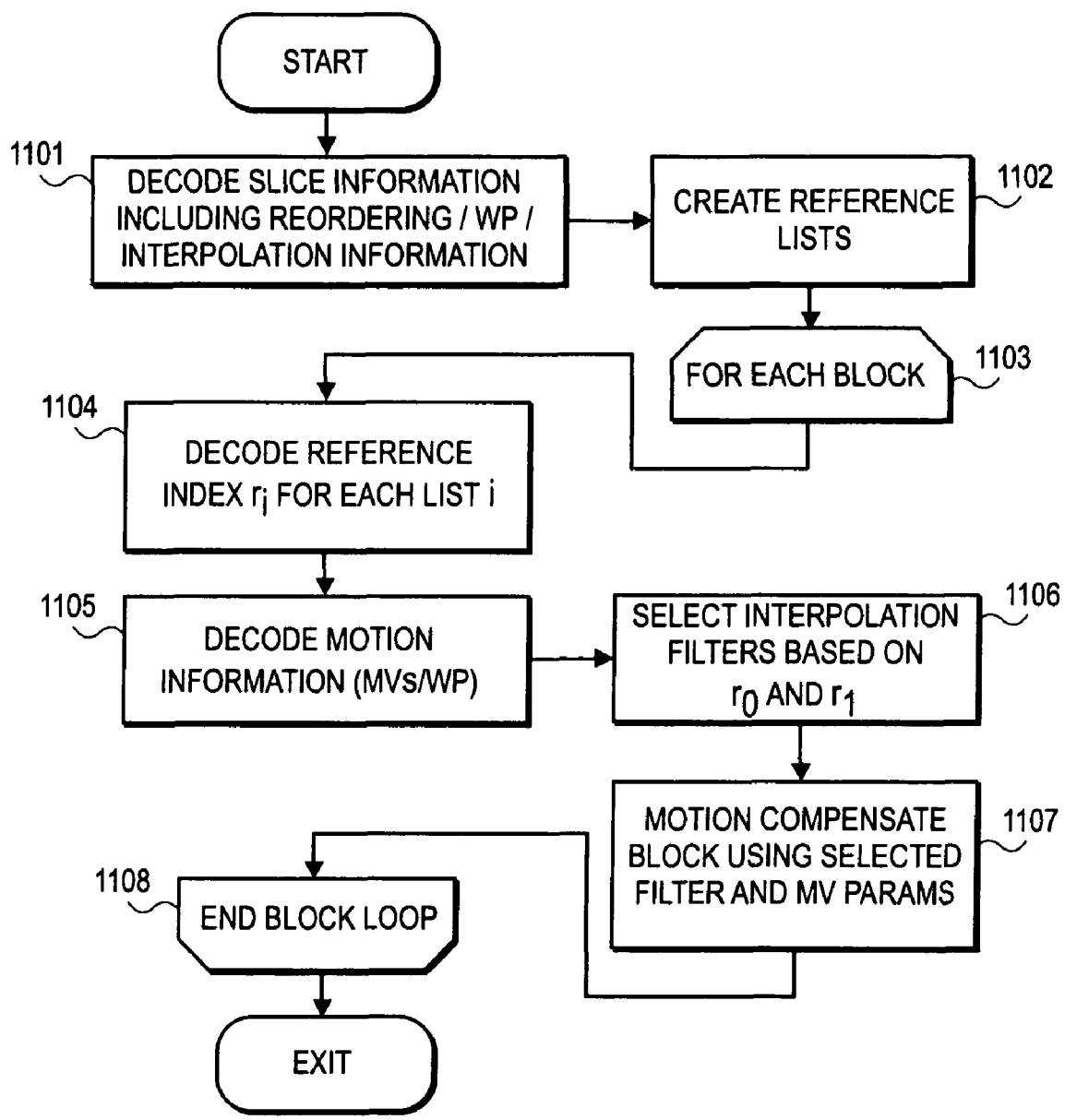
FIG. 11 is a flow diagram of one embodiment of a decoding process that includes interpolation selectivity.

FIG. 11 is a flow diagram of one embodiment of an interpolation selectivity process performed by a decoder. The process is performed by processing logic that may comprise hardware (circuitry, dedicated logic, etc.), software (such as is run on a general purpose computer system or a dedicated machine), or a combination of both.

Referring to FIG. 11, the process begins by decoding slice information that includes reordering information, weighting parameter information and interpolation information (processing block 101). In one embodiment, the reordering information comprises reordering commands. After decoding the slice information, processing logic creates reference lists (processing block 1102). Then processing logic performs a loop for each block (processing block 1103) in which processing logic decodes a reference index $r_i$ for each list i (processing block 1104), decodes motion information that includes motion vectors and weighting parameters (processing block 1105), selects interpolation filters based on $r_0$ and $r_1$ (processing block 1106), and performs motion compensation using selected filters and motion vector parameters (processing block 1107). Thereafter, the loop ends (processing block 1108). After the loop ends, the process ends.

Adaptive fractional sample interpolation has been shown to provide additional benefits to motion compensated video coding. The techniques described herein may be used to efficiently consider and represent such adaptive fractional sample interpolation mechanisms by taking advantage of the reordering mechanisms provided in certain video coding standards such as H.264; improve coding efficiency (i.e. in terms of increased PSNR for a given bitrate) when local characteristics of a sequence vary in terms of aliasing; and improve coding efficiency for spatially scalable video coding architectures.

An Exemplary Computer System

Figure 13:
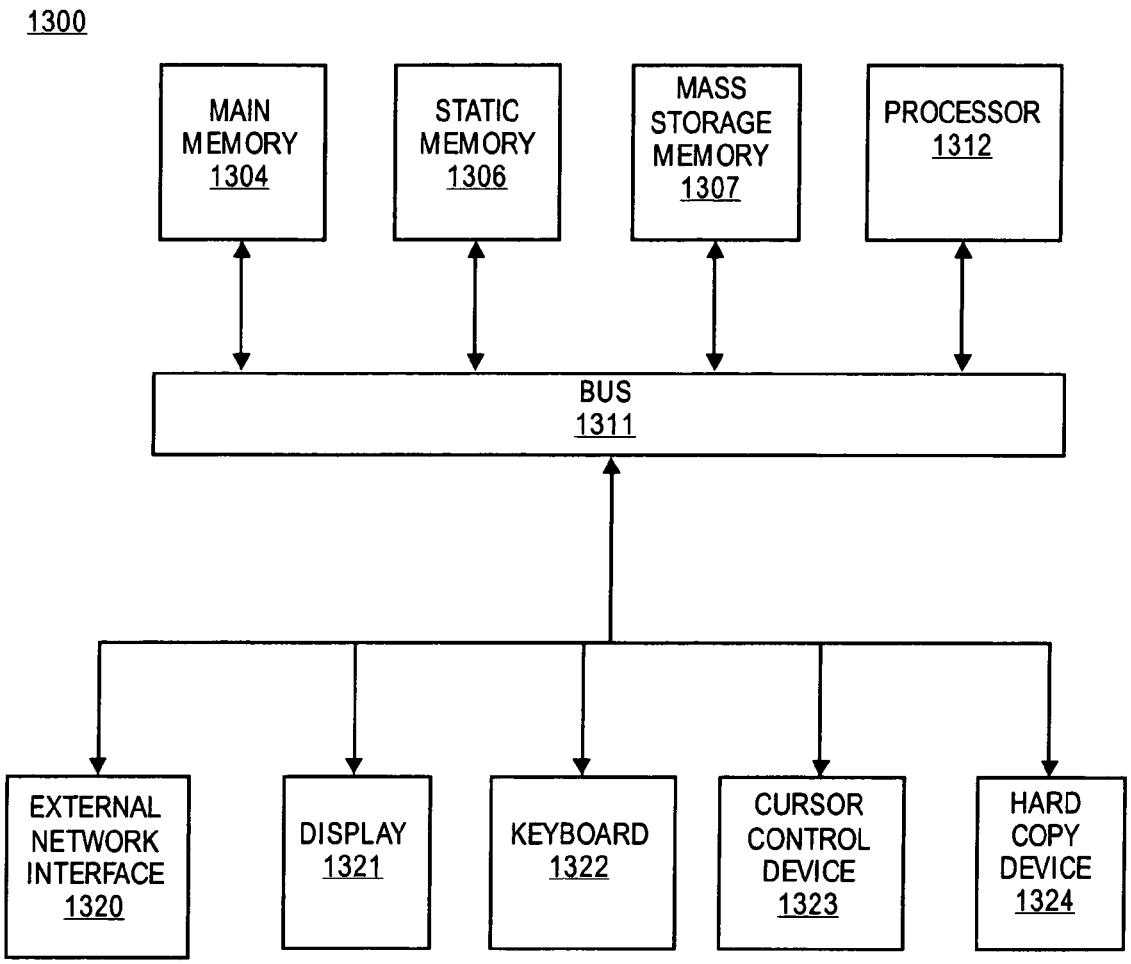
FIG. 13 is a block diagram of one embodiment of a computer system.

FIG. 13 is a block diagram of an exemplary computer system that may perform one or more of the operations described herein. Referring to FIG. 13, computer system 1300 may comprise an exemplary client or server computer system. Computer system 1300 comprises a communication mechanism or bus 1311 for communicating information, and a processor 1312 coupled with bus 1311 for processing information. Processor 1312 includes a microprocessor, but is not limited to a microprocessor, such as, for example, Pentium™, PowerPC™, Alpha™, etc.

System 1300 further comprises a random access memory (RAM), or other dynamic storage device 1304 (referred to as main memory) coupled to bus 1311 for storing information and instructions to be executed by processor 1312. Main memory 1304 also may be used for storing temporary variables or other intermediate information during execution of instructions by processor 1312.

Computer system 1300 also comprises a read only memory (ROM) and/or other static storage device 1306 coupled to bus 1311 for storing static information and instructions for processor 1312, and a data storage device 1307, such as a magnetic disk or optical disk and its corresponding disk drive. Data storage device 1307 is coupled to bus 1311 for storing information and instructions.

Computer system 1300 may further be coupled to a display device 1321, such as a cathode ray tube (CRT) or liquid crystal display (LCD), coupled to bus 1311 for displaying information to a computer user. An alphanumeric input device 1322, including alphanumeric and other keys, may also be coupled to bus 1311 for communicating information and command selections to processor 1312. An additional user input device is cursor control 1323, such as a mouse, trackball, trackpad, stylus, or cursor direction keys, coupled to bus 1311 for communicating direction information and command selections to processor 1312, and for controlling cursor movement on display 1321.

Another device that may be coupled to bus 1311 is hard copy device 1324, which may be used for marking information on a medium such as paper, film, or similar types of media. Another device that may be coupled to bus 1311 is a wired/wireless communication capability 1325 to communication to a phone or handheld palm device.

Note that any or all of the components of system 1300 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
a decoder to decode a reference index and a motion vector; and
a motion compensation module to select a reference frame according to the reference index and select one of a plurality of filters according to the reference index, the selected filter to filter a set of samples of the reference frame, determined by the motion vector, to obtain a predicted block.

2. The apparatus defined in claim 1 wherein each of the plurality of filters corresponds to an interpolation filter, such that each of a plurality of references is associated with one of a plurality of sets of filter parameters that correspond to one of a plurality of filters.

3. The apparatus defined in claim 2 wherein the interpolation filter is explicitly transmitted for use in decoding a bitstream containing encoded video data and encoded reference indices.

4. The apparatus defined in claim 2 wherein at least one of the plurality of filters is selected from a group consisting of a 6 tap filter associated with parameters in the form of $\{1, -5, 20, 20, -5, 1\}/32$; a bilinear interpolation filter; and a bicubic interpolation filter.

5. The decoder defined in claim 1 wherein filtering parameters are also defined for a set of chroma components.

6. The apparatus defined in claim 1 further comprising:
the decoder to decode a slice header that defines a correspondence between the reference index and a combination of the reference frame and the one of the plurality of filters.

7. A method for generating a predicted block in a video decoder comprising:
decoding a reference index;
decoding a motion vector;
selecting a reference frame according to the reference index;
selecting a filter according to the reference index; and
filtering a set of samples of the reference frame using the filter to obtain the predicted block, wherein the set of samples of the reference frame is determined by the motion vector.

8. A non-transitory computer-readable storage medium storing instructions thereon which, when executed by a system, cause the system to perform a method to generate a predicted block comprising:
decoding a reference index;
decoding a motion vector;
selecting a reference frame according to the reference index;
selecting a filter according to the reference index; and
filtering a set of samples of the reference frame using the filter to obtain the predicted block, wherein the set of samples of the reference frame is determined by the motion vector.

* * * * *